(12) United States Patent
Fideu Siagam et al.

(10) Patent No.: US 9,827,744 B2
(45) Date of Patent: Nov. 28, 2017

(54) LIGHTNING STRIKE PROTECTION MATERIAL FOR DRY LAY-UP / DRY FIBER PLACEMENT DEVICE

(71) Applicant: Airbus Operations GmbH, Hamburg (DE)

(72) Inventors: Paulin Fideu Siagam, Hamburg (DE); Hauke Seegel, Hamburg (DE); Claus Fastert, Hamburg (DE); Holger Mueller, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 53 days.

(21) Appl. No.: 14/666,834

(22) Filed: Mar. 24, 2015

(65) Prior Publication Data

US 2015/0336684 A1    Nov. 26, 2015

(30) Foreign Application Priority Data

Mar. 24, 2014 (DE) .......................... 10 2014 004 118

(51) Int. Cl.
    *H05F 3/00* (2006.01)
    *B32B 15/14* (2006.01)
    (Continued)

(52) U.S. Cl.
    CPC ............ *B32B 15/14* (2013.01); *B29C 70/386* (2013.01); *B29C 70/46* (2013.01); *B29C 70/688* (2013.01); *B32B 3/14* (2013.01); *B32B 5/026* (2013.01); *B64D 45/02* (2013.01); *H02G 13/80* (2013.01); *B29K 2101/10* (2013.01); *B29K 2101/12* (2013.01); *B29K 2105/089* (2013.01); *B29K 2307/04* (2013.01); *B29K 2705/00* (2013.01); *B29K 2995/0005* (2013.01);
    (Continued)

(58) Field of Classification Search
    USPC ....................................................... 361/220
    See application file for complete search history.

(56) References Cited

U.S. PATENT DOCUMENTS 2,412,201 A * 12/1946 Brennan ................ H01G 9/048
                                                    29/25.03
3,989,984 A * 11/1976 Amason ................ B29C 70/885
                                                    244/1 A (Continued)

FOREIGN PATENT DOCUMENTS

DE          69508899       12/1999
DE          05819580       4/2008

(Continued)

OTHER PUBLICATIONS

German Search Report, dated Jan. 23, 2015.

*Primary Examiner* — Ronald W Leja
(74) *Attorney, Agent, or Firm* — Greer, Burns & Crain Ltd.

(57) ABSTRACT

A flat metallic structure having a multiplicity of openings and having a width between 6 and 1000 mm. The metallic structure is treated with a metallic impregnating material whose melting point is lower than that of the flat metallic structure, and wherein the conductivity of the metal before the impregnation is at least 15 S/m. A use of such a structure as lightning protection for fiber composite components, as well as fiber composite components having such a structure, and a method for the production of such fiber composite components.

17 Claims, 2 Drawing Sheets

(51) Int. Cl.

| | | |
|---|---|---|
| *B29C 70/46* | (2006.01) |
| *B29C 70/68* | (2006.01) |
| *B29C 70/38* | (2006.01) |
| *B32B 3/14* | (2006.01) |
| *H02G 13/00* | (2006.01) |
| *B64D 45/02* | (2006.01) |
| *B32B 5/02* | (2006.01) |
| *B29K 101/10* | (2006.01) |
| *B29K 101/12* | (2006.01) |
| *B29K 105/08* | (2006.01) |
| *B29K 307/04* | (2006.01) |
| *B29L 9/00* | (2006.01) |
| *B29L 31/30* | (2006.01) |
| *B29K 705/00* | (2006.01) |

(52) U.S. Cl.
CPC ... *B29L 2009/00* (2013.01); *B29L 2031/3082* (2013.01); *B32B 2260/021* (2013.01); *B32B 2260/046* (2013.01); *B32B 2262/103* (2013.01); *B32B 2307/202* (2013.01); *B32B 2571/00* (2013.01); *B32B 2605/18* (2013.01)

(56) References Cited

U.S. PATENT DOCUMENTS

| | | |
|---|---|---|
| 4,448,838 A | 5/1984 | McClenahan et al. |
| 5,386,345 A | 1/1995 | Matsuzaki et al. |
| 5,863,667 A | 1/1999 | Poggi |
| 2009/0022975 A1* | 1/2009 | Hales ............... B32B 5/26 428/311.11 |
| 2009/0226746 A1* | 9/2009 | Chakrabarti ...... C04B 37/025 428/469 |
| 2012/0003495 A1* | 1/2012 | Cavaliere ............ B32B 15/14 428/596 |
| 2012/0063050 A1 | 3/2012 | Langone et al. |
| 2013/0118770 A1 | 5/2013 | De Jong et al. |
| 2013/0271891 A1 | 10/2013 | Shimp et al. |
| 2013/0328226 A1 | 12/2013 | Bergerson et al. |
| 2015/0252184 A1* | 9/2015 | Arai ..................... C08J 5/24 523/434 |
| 2015/0336684 A1* | 11/2015 | Fideu Siagam ...... B29C 70/46 361/220 |

FOREIGN PATENT DOCUMENTS

| | | |
|---|---|---|
| DE | 102011086101 | 5/2013 |
| WO | 2010135318 | 11/2010 |

\* cited by examiner

LIGHTNING STRIKE PROTECTION MATERIAL FOR DRY LAY-UP / DRY FIBER PLACEMENT DEVICE

CROSS-REFERENCES TO RELATED APPLICATIONS

This application claims the benefit of the German patent application No. 102014004118.2 filed on Mar. 24, 2014, the entire disclosures of which are incorporated herein by way of reference.

BACKGROUND OF THE INVENTION

The present invention relates to lightning protection for fiber composite components. Fiber composite components can be, for example, a part of the fuselage shell or a wing part of an aircraft, a motor vehicle body part, a rotor blade, a mast, or an antenna. In addition, the present invention relates to a method for the automated production of such a fiber composite component having lightning protection.

In the sense of the present description, a fiber composite component is a component that is made up substantially of a fiber composite plastic that substantially contains reinforcing fibers that are embedded in a solid matrix. The reinforcing fibers can preferably be aramid or glass fibers, in particular, carbon fibers or mixtures containing these. The matrix can be a thermosetting or thermoplastic binding agent. The reinforcing fibers are saturated with this binding agent as long as it is liquid. Subsequently, the binding agent cures and fixes the reinforcing fibers.

In the sense of the present description, a laminate construction is to be understood as a plurality of layers made up substantially of reinforcing fibers, the reinforcing fibers being layered one over the other substantially in dry form as strips, bands, textiles, knitted fabrics, braids, and/or strands, but not yet fixedly bound to one another by the cured matrix. A laminate construction is also referred to as a fabric. Here, substantially dry reinforcing fibers are reinforcing fibers that are not impregnated or that have only a slight impregnation, whose function is to prevent slippage of the fibers placed on one another.

In the sense of the present description, a flat metallic structure is a structure made substantially of metal having in one spatial direction a significantly smaller extension than in the orthogonal spatial directions. Such a structure can be a foil, a plate, a mesh, a textile, or a multiplicity of foil strips. According to the present invention, such a flat metallic structure has openings.

In the sense of the present description, openings are preferably to be understood as holes, loops, cavities, and/or through-holes. In the sense of the present description, "impregnating means" refers to a medium or material that adheres to the surface of a substrate, preferably in the form of a liquid, a solidified or viscous liquid, or a powder.

In the sense of the present description, "lightning protection means" refers to a conductive material that can be situated on a surface that is to be protected from lightning strikes and that makes it possible to accept the current that occurs momentarily during a lightning strike in such a way that the surface to be protected suffers no, or only minor, structural damage.

In particular in modern aircraft engineering, components are widely used that are produced with fiber composite plastics. In the structural parts of aircraft, carbon fiber-reinforced thermosetting plastics are preferentially used, but carbon fiber-reinforced thermoplastic high-performance plastics are also sometimes used. In addition, other reinforcing fibers, such as glass fibers or aramid fibers, can also be used. The use of fiber composite plastics provides a significant potential for saving weight, resulting, inter alia, in extended travel range due to reduced fuel consumption. In addition, in comparison with the metallic materials standardly used up to now in aircraft construction, in particular aluminum alloys, plastics have outstanding corrosion resistance and fatigue strength, and as a result in particular servicing and maintenance expenses in the operation of such aircraft can be significantly reduced.

Due to the fact that the electrical conductivity of the fiber composite plastics is, as a rule, significantly lower than that of metallic materials, additional measures must be taken in particular for lightning protection and the return connection to ground of the on-board electrical systems. The return connection to ground takes place for example via additional copper lines having large conductor cross-sections, while the lightning protection is realized by metals integrated into the outer surface of the structural components.

Currently used production methods for structural components, such as partial shells for fuselage sections or wing parts, often make use of the so-called ATL (Automated Tape Laying) method. Here, a so-called pre-preg material, usually in the form of strips, is placed in automated fashion, using a suitable device, on a shape-defining tool in various spatial directions until the fiber composite component to be produced has reached a specified material thickness in all regions. The pre-preg material is reinforcing fiber bundles or strands, in particular carbon fiber strands, pre-impregnated by the producer with a curable thermosetting plastic resin.

After the laying of the pre-preg material, in the known procedures, the lightning protection is applied manually. For this purpose, a strip-shaped copper foil having a large width of, for example, 889 mm (35") is laid onto the pre-preg material in overlapping strips and is pressed on.

Subsequently, the structure is cured with application of pressure and/or heat, for example using a vacuum bag structure in an autoclave, to form the finished fiber composite component.

This known procedure is characterized by a high degree of manual labor, resulting, inter alia, in high production costs. The strip-by-strip overlapping application of the copper foil achieves good conductivity even transverse to the direction of the strips, and high own weight of the conductive layer.

Another currently used production method for structural components is the automatic placement of dry fibers or strips, also called the DFP (Dry Fiber Placement) method. The fiber or strip material, not pre-impregnated with curable material, is placed in automated fashion, using a suitable device, on the tool in various spatial directions until the fiber composite component to be produced has reached a specified material thickness in all regions. The fixing of the individual fiber strands is accomplished using so-called binders. These are adhesives that can be activated by pressure or temperature. A lightning protection material can be applied automatically, either as a first or as a last layer. Preferably, this takes place in a female-mold process, in which the lightning protection material is placed into a negatively curved mold, for example a concave mold; i.e., the process begins with the placement of the copper layer. The lightning protection material is for example strips of copper mesh that can be produced for example from a copper foil through multiple unidirectional cutting in, and subsequent stretching perpendicular to the run of the cuts, similar to an iron expanded grid. Here, in order to ensure adequate conductivity between the individual copper mesh strips, i.e., transverse to the direction of laying, either further copper mesh strips are applied crosswise, or at least the copper strips significantly overlap one another. The finished dry structure is then infused with a curable thermosetting plastic resin, and, as described above, is cured under application of pressure or vacuum and/or heat to form the finished fiber composite component.

Both the DFP and the ATL method are also referred to as automated fiber placement methods (AFP). Both methods can be carried out in an economically feasible manner only if the laying of the strips or fibers is carried out in automated fashion by a tape or fiber laying machine.

From DE 05819580, it is known to embed a conductive layer, in the form of a mesh or of a foil, in a surface panel.

WO2010/135318 discloses automatic laying of lightning protection material during the production of a composite component.

SUMMARY OF THE INVENTION

According to all this, the existing art lacked a lightning protection means that could be processed with a fiber or tape laying machine during, or as first or last step of, production of the laminate construction, and that ensured, in a largely one-layer realization, a conductivity adequate for protection against lightning strikes, in particular transverse to the run of its individual bands or strips.

In a surprising manner, not foreseeable by someone skilled in the art, it has turned out that a flat metallic structure having a multiplicity of openings and having a width between 6 and 1000 mm, characterized in that the metallic structure is treated with a metallic impregnating means whose melting point is lower than that of the flat metallic structure, and in that the conductivity of the metal before the impregnation is at least 15 S/m, provides a remedy for the disadvantages of the existing art. In this way, lightning protection of a fiber composite component can be achieved that, while itself having a low weight, has adequate conductivity in all directions along the surface. Here, the impregnating means, melted on during the laying process or later, bonds the individual strips of the flat metallic structure during the subsequent solidification. The melting on takes place using a device that transfers energy to the impregnating means, such as a laser, an IR irradiation device, a hot wire, or the hot laying head itself. The melting point of the metallic impregnating means is matched to the curing temperature (consolidation temperature) of the matrix used, and can be slightly higher than the consolidation temperature, preferably 1 to 25° C. above the maximum consolidation temperature of the matrix material, particularly preferably 5 to 15° C. above the maximum consolidation temperature of the matrix material. Standard consolidation temperatures are room temperature, 125° C., 180° C., for example in the case of thermosetting matrices, and 350° C. or 450° C., for example in the case of thermoplastic matrices such as PEEK or PEEK polymer blends. The flat metallic structure preferably has a ratio of its smallest width to its greatest thickness greater than 1000:1. A preferred impregnating means is a tin alloy, for example Sn42Bi58, Sn43Pb43Bi14, Sn62Pb36Ag2, Sn63Pb37, Sn60Pb40, Sn96.5Ag3.0Cu0.5, Sn96Ag4(Sn96.3Ag3.7), Sn95Ag5, Sn99.3, Cu0.7, Sn99Ag0.3Cu0.7, Sn100 Sn95Sb5, Sn89Sb10.5Cu0.5, Sn10Pb88Ag2, Sn10Pb90, Au80Sn20, Sn5Pb92.5Ag2.5, Sn5Pb95. Hard solders having a melting temperature higher than 450° C. are also within the scope of the present invention. A particularly preferred impregnating means is Sn62Pb36Ag2, because the consolidation temperature of many aircraft components is 180° C. Preferably, the melting point of the impregnating means is so high that subsequent processing steps are carried out at temperatures below the melting point of the impregnating means. In this way, it is possible to prevent an undesired melting of the impregnating means that bonds the individual strips of the metallic structure and a later reduction of the previously achieved conductivity transverse to the orientation of the individual strips of the metallic structure. The impregnating means additionally stabilizes the flat metallic structure, which is highly advantageous in particular if the metallic structure is very delicate. The metallic structure can be made of bronze. Preferably, its conductivity is at least 35 S/m, which is achieved by aluminum, and particularly preferably its conductivity is at least 50 S/m, which is achieved by silver and copper. It is preferable if the mean surface weight of the metallic structure is 10 to 600 g/m2, particularly preferably 250 g/m2 to 600 g/m2. It is preferable if the weight ratio of impregnating means to metallic structure is between 1:10 and 1:100. It is preferable if the openings of the metallic structure are at least 1 mm at their narrowest point. It is preferable if the metallic structure is strip-shaped. Such structures can be processed using tape or fiber laying machines. It is particularly preferable if the strip-shaped metallic structures are laid in such a way that they overlap by at most 1% of the overall surface of the laid metallic structures; quite particularly preferably they do not overlap. It is preferred if the impregnation takes place through rolling or calendering of the flat metallic structure with impregnating means in powder form, or alternatively by bringing the flat metallic structure into contact with the melted impregnating means. It is preferable if the impregnation is applied to at least one edge of the flat metallic structure, particularly preferably at two oppositely situated edges. Here the width of the impregnation is at least 1.5 mm, in the case of one-sided impregnation at least 3 mm, and at most 3 mm in the case of impregnation on both sides of the metallic structure. It is particularly preferred if the melted impregnating means is applied by a tape or fiber laying machine. This can take place using a nozzle that applies liquid impregnating means in a manner similar to a print head of a printer. It is quite particularly preferred if the flat metallic structure is additionally coated with a pressure-activated adhesive and/or a heat-activated adhesive. In this way, slippage of the already-laid structures can be prevented. The present invention also includes the use of an above-described impregnated flat metallic structure as lightning protection means for fiber composite components. The present invention also includes a fiber composite component having a plurality of above-described impregnated flat metallic structures that are at least partially bonded to one another in electrically conductive fashion by the solidified impregnation.

Here, the melting on of the impregnation can preferably take place in the mold before layers of reinforcing fibers are applied. This can take place through heat radiation, through the temperature of the hot laying head, or using a laser. The laser can also be integrated in the laying head. The temperature can be selected such that the mold, or in particular an anti-adhesive coating on the mold surface, is not thermally damaged. It is preferable if at most 1% of the overall surface of the laid metallic structures overlap. It is preferred in such a fiber composite component if the individual strips of the metallic structure substantially have a spacing of 2 mm. It is preferred in such a fiber composite component if the impregnated flat metallic structures are embedded in a matrix. It is preferred in such fiber composite components if the consolidation of the fiber composite component takes place at high temperature, and the melting point of the impregnation of the flat metallic structures is above the maximum consolidation temperature, preferably at least 1° C., particularly preferably 3° C., quite particularly preferably 5° C. above the maximum consolidation temperature. The present invention also includes a method for the automated production of a fiber composite component, in particular for a partial shell of an aircraft, in which a plurality of the above-described flat metallic structures is integrated, the fiber composite component having a fiber composite plastic, in particular having a fiber composite component formed with a thermosetting and/or thermoplastic fiber composite plastic, having the steps:

a1) automated laying of a strip-shaped pre-preg material or dry strip-shaped reinforcing fiber strands on a positive tool, and subsequent automated laying, at least in some regions, of a plurality or multiplicity of impregnated flat metallic structures onto the pre-preg material or onto the reinforcing fiber strands or a2) automated laying at least in some regions of a strip-shaped impregnated flat metallic structure onto a negative tool and subsequent automated laying at least in some regions of a strip-shaped pre-preg material or dry strip-shaped reinforcing fiber strands onto the placed impregnated flat metallic structures, including regions of the negative tool left exposed thereby, and b1) curing of the laminate construction formed with the pre-preg material and with the impregnated flat metallic structures to form the fiber composite component, or b2) infiltration of the laminate structure, formed with the infiltrated reinforcing fiber strands and the flat metallic structures, with a plastic, in particular with a thermosetting and/or thermoplastic plastic, and subsequent curing of the laminate structure to form the fiber composite component, either an above-described impregnated flat metallic structure being used or an above-described but not impregnated flat metallic structure being used or the metallic impregnating means being applied during or after the laying of the flat metallic structure. This can take place using a dosing device for the metallic impregnating means, independent of the laying head of the strip-shaped materials, or such a dosing device for the metallic impregnating means can be integrated in the laying head.

Here, the pre-preg material can be impregnated both thermoplastically and also in thermosetting fashion. It is preferred if the width of the pre-preg material or of the drive reinforcing fiber strands corresponds substantially to the width of the impregnated flat metallic structures, the width of the pre-preg material or of the dry reinforcing fiber strands, and of the impregnated flat metallic structures, being between 1 mm and 100 mm. Preferably, in such a method the laying of the pre-preg material and of the dry reinforcing fiber strands, as well as of the impregnated flat metallic structures, takes place in each case using the same laying machine. Preferably, in such a method the pre-preg material is a thermosetting and/or thermoplastic plastic reinforced with carbon fibers, and the substantially dry reinforcing fiber strands are formed with carbon fibers. Preferably, in a fiber composite component according to the present invention the impregnated flat metallic structures run parallel at least in some regions, and are situated edge to edge adjacent one another and/or with a spacing of at most 2 mm from one another.

BRIEF DESCRIPTION OF THE DRAWINGS

Further features, advantages, and possible applications of the present invention result from the following description of the exemplary embodiments and of the Figures. All described and/or graphically depicted features form, by themselves and in arbitrary combination, the subject matter of the present invention, independent of their summarization in the individual claims or relations of dependency thereof. In the Figures, identical reference characters designate identical or similar objects.

DETAILED DESCRIPTION OF THE PREFERRED EMBODIMENTS

Figure 1:
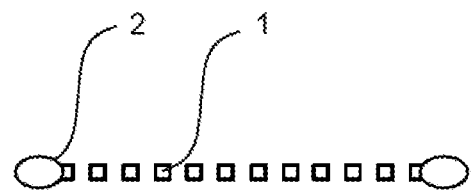
FIG. 1 shows a cross-section through a flat metallic structure according to the present invention.
Figure 2:
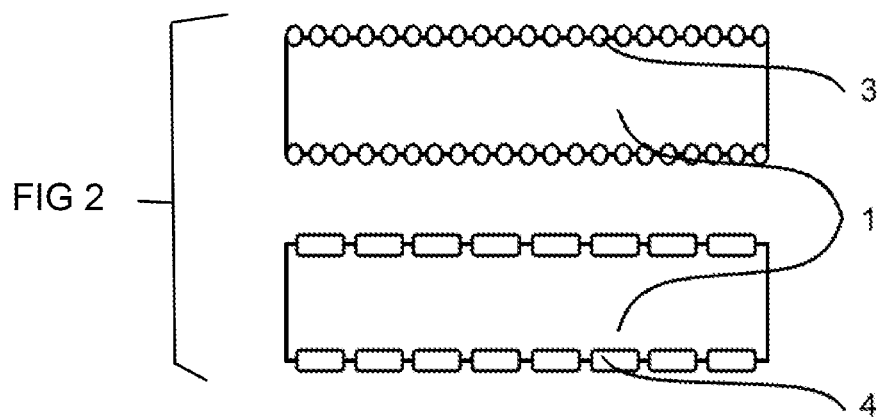
FIGS. 2 and 3 show various specific embodiments of the impregnation of structures according to the present invention.
Figure 3:
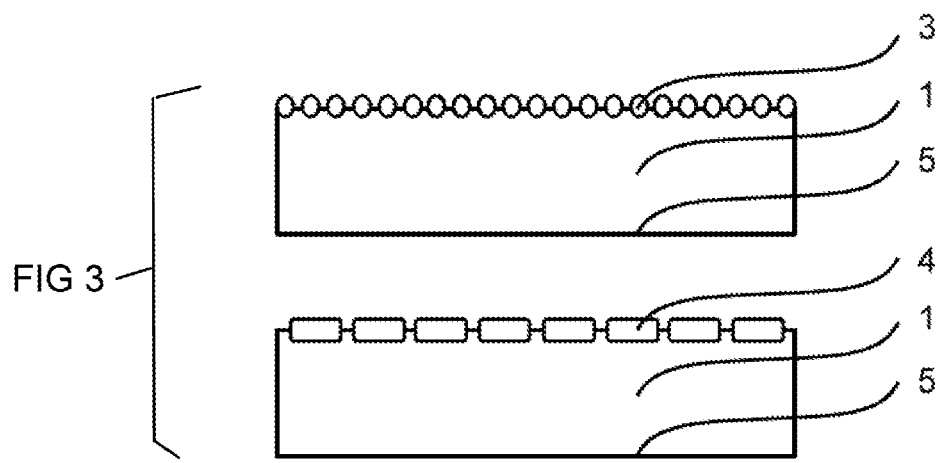

FIG. 1 shows a cross-section through a flat metallic structure according to the present invention, made up of a metallic mesh (1) and impregnation (2) applied at the edges. Such a flat metallic structure according to the present invention can be strip-shaped. So that a flat metallic structure according to the present invention can be wound onto spools for storage and for easier handling, the impregnation along the impregnated edge of the flat metallic structure according to the present invention can be configured in small, discontinuously applied portions. This is shown in FIG. 2. On the edges of the strip-shaped flat metallic structure (1) according to the present invention, the impregnation (3) can be applied in portions whose length corresponds approximately to their width, so that the impregnating means (3) is situated in the fashion of a string of pearls on an edge of the flat metallic structure according to the present invention. If the impregnation is applied in segments (4) on the edges of the strip-shaped flat metallic structure (1) according to the present invention, where the length of the portions significantly exceeds their width, then the length of these longitudinal segments of the impregnation (4) can be dimensioned such that the strip-shaped flat metallic structure (1) according to the present invention is still easily manipulable, and can for example be wound onto spools. FIG. 3 shows further specific embodiments of the impregnation of structures according to the present invention, in which a long edge of the strip-shaped flat metallic structure (1) has impregnations (3) or (4), while another long edge (5) is free of impregnation. Here, the impregnating means (3) can be configured in the manner of a string of pearls or in larger longitudinal segments (4) along the one edge. The impregnating means can also be applied onto the corresponding edge only shortly before the laying of the strip-shaped flat metallic structure (1) according to the present invention onto a fabric or onto a laminate structure.

Figure 4:
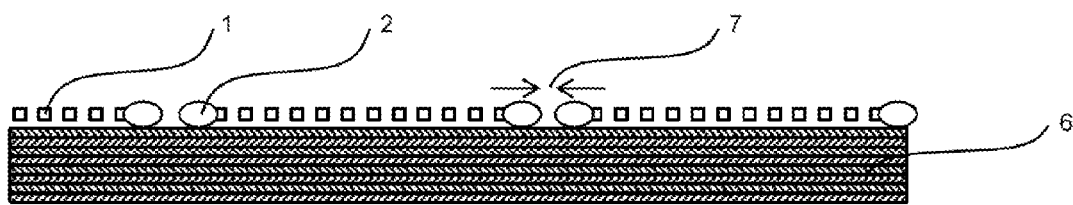
FIG. 4 shows a fabric having structures according to the present invention applied thereon.
Figure 5:
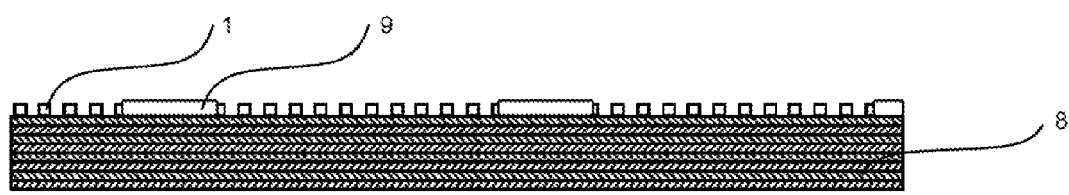
FIG. 5 shows a fiber composite component according to the present invention after curing.

FIG. 4 shows a cross-section through a fabric of reinforcing fibers (6) on whose surface there are situated a plurality of flat metallic structures (1) according to the present invention having the impregnation (2). The flat metallic structures according to the present invention are configured here so that they do not overlap; rather, a spacing (7) can be provided between two strands of flat metallic structures (1) according to the present invention having impregnation (2) along the edges thereof. If this configuration is solidified under pressure and heat, possibly after being infiltrated with plastic, then a component as shown in FIG. 5 is obtained, in which the flat metallic structures (1) according to the present invention lie on the fiber composite (8) and are bonded to the fiber composite (8) by matrix material (not shown). The impregnation (9) melted on during the tempering, and later solidified, bonds, at least at points, the applied structures according to the present invention in an electrically conductive manner.

In addition, it is to be noted that "having" does not exclude other elements or steps, and "a" does not exclude a plurality. In addition, it is to be noted that features that have been described with reference to one of the above exemplary embodiments can also be used in combination with other features of other exemplary embodiments described above. Reference characters in the claims are not to be regarded as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE CHARACTERS 1 flat metallic structure
2 impregnation
3 impregnation at a point
4 longitudinally extended impregnation
5 non-impregnated edge of the flat metallic structure
6 fabric (laminate structure)
7 spacing between two flat metallic structures
8 fiber composite
9 electrically conductive bond between two flat metallic structures

The invention claimed is:

1. A flat metallic structure comprising:
a multiplicity of openings,
a width of between 6 and 1000 mm,
the metallic structure being treated with a metallic impregnating material whose melting point is lower than that of the flat metallic structure, the metallic impregnating material being applied in spaced segments along at least one long edge of the flat metallic structure, and
a conductivity of the metal of the metallic structure before the impregnation is at least 15 S/m,
wherein the impregnation takes place through rolling or calendering of the flat metallic structure with impregnating material in the form of powder.

2. The structure as recited in claim 1, wherein a mean surface weight of the metallic structure is in the range of 10 to 600 g/m2.

3. The structure as recited in claim 1, wherein the ratio of impregnating material to metallic structure is in the range of 1:10 and 1:100.

4. The structure as recited in claim 1, wherein the impregnation is applied on at least one edge of the flat metallic structure, and the impregnation has a width of at least 1.5 mm.

5. The structure as recited in claim 1, further comprising a fiber composite component on which the flat metallic structure is applied as a lightning protection member for such fiber composite components.

6. The structure as recited in claim 1, wherein the metallic structure is strip-shaped and the metallic impregnating material is applied along one long edge of the strip-shaped flat metallic structure, while another long edge is free of impregnation.

7. The structure as recited in claim 1, wherein the metallic structure is strip-shaped and the metallic impregnating material is applied in spaced portions whose lengths correspond approximately to widths of the portions.

8. A fiber composite component having a plurality of impregnated flat metallic structures applied thereon, each metallic structure comprising:
a multiplicity of openings,
a width of between 6 and 1000 mm,
the metallic structure being treated with a metallic impregnating material whose melting point is lower than that of the flat metallic structure, and
a conductivity of the metal of the metallic structure before the impregnation is at least 15 S/m,
wherein the metallic structures are bonded to one another in electrically conductive fashion at least in part by the solidified impregnation
wherein the impregnation takes place through rolling or calendering of the flat metallic structure with impregnating material in the form of powder.

9. The fiber composite component as recited in claim 8, wherein the impregnated flat metallic structures run parallel at least in some regions, and are situated edge to edge adjacent to one another with a spacing in a range of 0-2 mm from one another.

10. The fiber composite component as recited in claim 8, wherein a consolidation of the fiber composite component takes place at a high temperature, and a melting point of the impregnation of the flat metallic structures is higher than a maximum consolidation temperature.

11. A method for the automated production of a fiber composite component in which a plurality of flat metallic structures are integrated, the flat metallic structures each comprising:
a multiplicity of openings,
a width of between 6 and 1000 mm,
the metallic structure being treated with a metallic impregnating material whose melting point is lower than that of the flat metallic structure, and
a conductivity of the metal of the metallic structure before the impregnation is at least 15 S/m,
the fiber composite component being formed with a fiber composite plastic comprising at least one of a thermosetting and thermoplastic fiber composite plastic, the method comprising the steps:
a1) automatically laying a strip-shaped pre-preg material or dry strip-shaped reinforcing fiber strands on a positive tool, and subsequently automatically laying, at least in some regions, a plurality or multiplicity of impregnated flat metallic structures onto the pre-preg material or onto the reinforcing fiber strands, or
a2) automatically laying, at least in some regions, a strip-shaped impregnated flat metallic structure onto a negative tool and subsequently automatically laying, at least in some regions, a strip-shaped pre-preg material or dry strip-shaped reinforcing fiber strands onto the placed impregnated flat metallic structures, including regions of the negative tool left exposed thereby, and b1) curing the laminate construction, formed with the pre-preg material and with the impregnated flat metallic structures, to form the fiber composite component, or b2) infiltrating the laminate structure, formed with the infiltrated reinforcing fiber strands and the flat metallic structures, with a plastic, comprising a thermosetting plastic, and subsequently curing the laminate structure to form the fiber composite component, wherein a conductivity of the metal of the flat metallic structure before the impregnation is at least 15 S/m and wherein a material used for impregnating the flat metallic structure has a melting point lower than that of the flat metallic structure.

12. The method as recited in claim 11, wherein the laying of the pre-preg material and the dry reinforcing fiber strands, as well as of the impregnated flat metallic structures, takes place using a same laying machine.

13. The method as recited in claim 11, wherein the pre-preg material is at least one of a plastic reinforced with carbon fibers, a thermosetting plastic, and a thermoplastic plastic, and the substantially dry reinforcing fiber strands are formed with carbon fibers.

14. The method as recited in claim 11, wherein the impregnated flat metallic structures are impregnated prior to the laying of the flat metallic structure.

15. The method as recited in claim 11, wherein the impregnated flat metallic structures are impregnated during the laying of the flat metallic structure.

16. The method as recited in claim 11, wherein the impregnated flat metallic structures are impregnated after the laying of the flat metallic structure.

17. The method as recited in claim 11, wherein the fiber composite component comprises a partial shell of an aircraft.

* * * * *